United States Patent

Braatz et al.

[11] Patent Number: 5,591,529
[45] Date of Patent: Jan. 7, 1997

[54] OPTICAL FILTER HAVING MULTI-LAYER COATING

[75] Inventors: Christoph Braatz, Hainburg; Joachim Szczyrbowski, Goldbach; Anton Zmelty, Hösbach, all of Germany

[73] Assignee: Leybold Aktiengesellschaft, Hanau, Germany

[21] Appl. No.: 400,157

[22] Filed: Mar. 7, 1995

[30] Foreign Application Priority Data

Mar. 7, 1994 [DE] Germany .......................... 44 07 502.2

[51] Int. Cl.$^6$ ................................................ B32B 15/04
[52] U.S. Cl. .................... 428/457; 428/216; 428/432; 428/433; 428/472; 428/632; 428/697; 428/701; 428/702; 359/359; 359/360; 359/585
[58] Field of Search .................... 428/432, 216, 428/433, 457, 472, 701, 702, 632, 697; 359/359, 360, 585

[56] References Cited

U.S. PATENT DOCUMENTS

| | | | |
|---|---|---|---|
| 3,034,924 | 5/1962 | Kraus et al. | 117/106 |
| 3,682,528 | 8/1972 | Apfel et al. | 350/1 |
| 4,462,883 | 7/1984 | Hart | 204/192 C |
| 4,548,691 | 10/1985 | Dietrich et al. | 204/192 P |
| 4,610,771 | 9/1986 | Gilery | 204/192.1 |
| 4,834,857 | 5/1989 | Gilery | 204/192.27 |
| 4,902,081 | 2/1990 | Huffer | 350/1.7 |
| 4,957,561 | 9/1990 | Esashi | 106/286.3 |
| 4,965,121 | 10/1990 | Young et al. | 428/213 |
| 5,085,926 | 2/1992 | Iida et al. | 428/216 |
| 5,094,691 | 3/1992 | Watanabe et al. | 106/286.4 |
| 5,153,054 | 10/1992 | Depauw et al. | 428/216 |
| 5,188,667 | 2/1993 | Watanabe et al. | 106/286.4 |
| 5,229,881 | 7/1993 | Day et al. | 359/360 |
| 5,296,302 | 3/1994 | O'shaughnessy et al. | 428/472 |
| 5,298,048 | 3/1994 | Lingle et al. | 65/60.2 |
| 5,302,449 | 4/1994 | Eby et al. | 428/336 |

FOREIGN PATENT DOCUMENTS 3744368  3/1989  Germany .
62-41740  2/1987  Japan .

*Primary Examiner*—William A. Krynski
*Attorney, Agent, or Firm*—Felfe & Lynch

[57] ABSTRACT

In a multi-layer coating for a material of good transparency for visible light, with an emissivity e<0.04 and a light transmission T≧78% and with two silver layers of different thickness, three oxide coatings are provided, and very thin metal or metal suboxide coatings as blockers, the oxide layers being alloys of the metals SnMg, SnAl, SnZr, SnTi or SnTa.

14 Claims, 1 Drawing Sheet

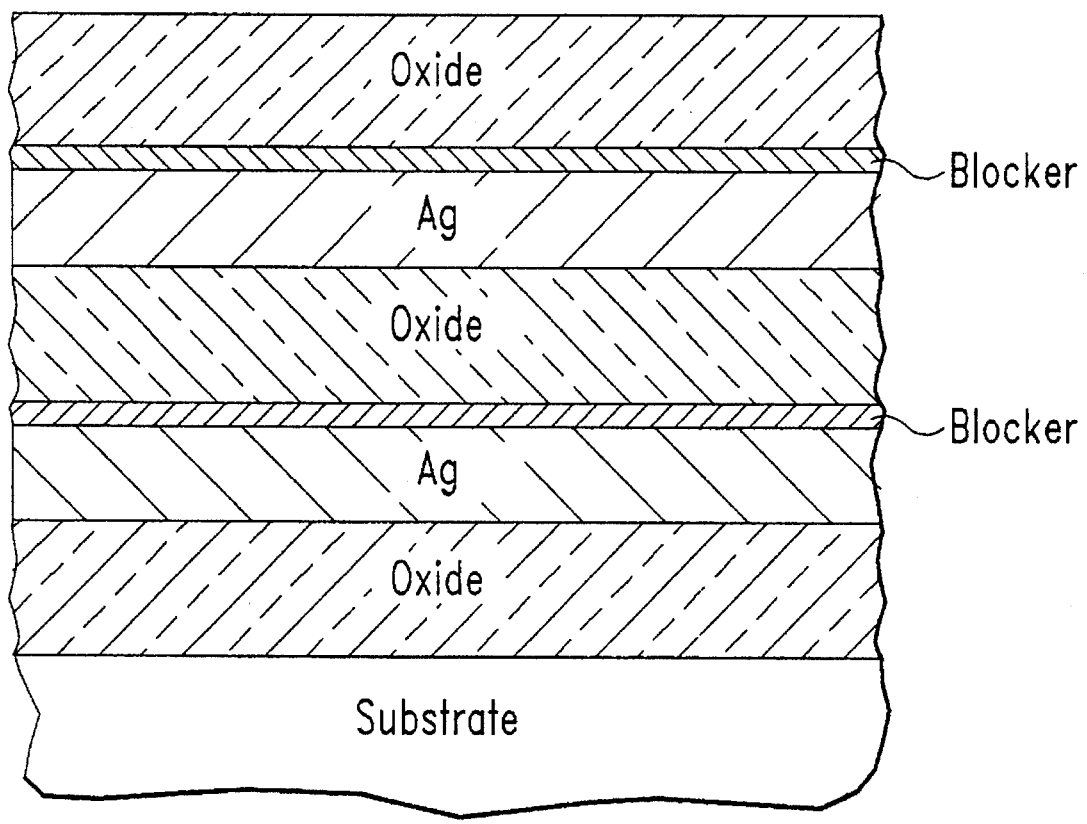

OPTICAL FILTER HAVING MULTI-LAYER COATING

BACKGROUND OF THE INVENTION

The invention relates to an optical filter including a transparent substrate having thereon a multilayer coating with low thermal emissivity, high light-transmission, and defined color coordinates.

U.S. Pat. No. 3,682,528 discloses an infra-red interference filter in which there is provided on one side of a transparent substrate, a coating having a first and a second double layer, each of which contains a first layer that is formed by a metal such as nickel and a second layer of silver. Between two double coatings a layer of a selected, transparent dielectric material, e.g., magnesium fluoride or titanium dioxide, is provided whose optical thickness amounts approximately to a quarter- wavelength, in the case of a selected reference wavelength. In the visible range of 400 to 700 nm, the thickness of each of the silver layers is between 55 and 130 Åangstroms. Each of the two first layers has a thickness greater than a minimum of about 5 Åangstroms with a maximum determined by the fact that the transparency in the application of the prime coating may vary by about 2%, so that the transparency of the filter is not markedly impaired.

This known multi-layer coating relates to an optical filter whose silver coatings are extremely thin, but nevertheless act substantially as solid metal plates and have very roughly the same optical properties as solid silver, the filter being suitable for repeatable industrial manufacture and having good stability, especially against moisture and abrasion.

U.S. Pat. No. 3,034,924 discloses a method for the preparation of a protective coating for optical purposes which consists of metal oxides deposited from a vapor on the substrate, e.g. magnesium oxides, and rare earth metals simultaneously deposited thereon from a vapor. This known method permits the application of thin oxide coatings on the basis of oxides and/or oxidizable starting materials, or the economical application of a plurality of coatings of different materials, especially metals and rare earth metals, such that the layers remain partially absorption-free.

Lastly, U.S. Pat. No. 4,965,121 discloses a combination of coatings for glass windows to reduce transmission of solar radiation, which includes two silver layers, the one layer of which has a lesser thickness than the other layer, and in which layers of dielectric material, of magnesium oxide for example, are disposed adjacent the two silver layers. The glass thus provided with five layers is said to be especially suitable as a windshield for automobiles, since the coating packet can have a largely neutral color.

Low-e coatings have generally an emissivity of about 0.1 and a light transmission of about 83%, the emissivity determining the coefficients of heat transmission "k" of window glazing. If the emissivity decreases from 0.1 to 0.04, for example, the k coefficient would be reduced by about 15%, i.e., the thermal energy loss through a window would thus be reduced by about the same percentage.

SUMMARY OF THE INVENTION

The problem to which the present invention is addressed is the low-cost and problem-free manufacture of a low-e coating with an emissivity e of less than 0.04 and a light transmission T equal to or greater than 79%.

This problem is solved with two silver layers and three oxide layers based on an alloy of tin having 5 to 15% alloy metal. Very thin metal or metal suboxides can be used as blockers, e.g. titanium, nickel, nickel-chromium, aluminum and zirconium.

In order to achieve high light transmission at the necessary emissivity, both the oxide layers and the blocker layers must show hardly any absorption.

BRIEF DESCRIPTION OF THE DRAWING

The sole FIGURE illustrates an embodiment of the invention.

DETAILED DESCRIPTION OF THE PREFERRED EMBODIMENT

A tin/X alloy is provided as oxide layer, selecting as X an element which has a lower electro-negativity (En) than the tin (En =1.96), e.g., magnesium (En =1.3), aluminum (1.61), zirconium (1.33), titanium (1.4), tantalum (1.5). The content of element X in the tin alloy is to greater than 5 at % and less than 15 at%. Magnesium, which in this range forms a eutectic with tin, is especially suitable.

According to the invention, the two silver layers have different thicknesses, the thickness of the second silver layer being greater than the thickness of the first silver layer, and the total thickness is selected such that the emissivity will be at the desired level. According to the invention, furthermore, gold, copper or aluminum can be used as heat-blocking layers.

A tin-magnesium oxide layer can be reactively sputtered directly or only with a very thin blocker onto the silver layer, without the thin silver layer being attacked by oxygen ions (which is not possible with conventional oxides such as stannic oxide or zinc oxide and others). Thus, a higher light transmission is achieved at the same emissivity.

Surprisingly, due to the catalytic behavior of the X element, the rate of the reaction of the tin with oxygen to form stannic oxide is accelerated during the sputtering operation. As a result, the oxygen excess in the sputtering chamber is greatly reduced, and with it the destructive action of the oxygen ions on silver is greatly lessened. This makes it possible either to eliminate the blocker layer or to sputter it on very thinly.

Surprisingly also, the conductivity of a silver layer sputtered onto tin/X alloy oxide is higher than it is for a silver layer sputtered onto tin oxide. This means that through this effect the light transmission of the coating systems can be increased at equal emissivity.

Increasing the thickness of the second silver layer surprisingly leads to a substantial increase in the light transmission of the entire coating due to better reduction of the reflectivity of the coating system.

EXAMPLES

In the examples described below, all of the oxide layers were produced by a reactive sputtering process in an argon/oxygen atmosphere from tin or tin/magnesium alloy (90/10 at. %). The sputtering pressure was approximately $3 \times 10^{-3}$ mbar. The blocker was sputtered sub-oxidically, i.e., in an argon/oxygen atmosphere, but in the metallic branch of the cathode characteristic.

The silver coatings were sputtered in an argon atmosphere.

The color coordinates were measured with C 2° standard illuminants:

| 1. Low-e coating with stannic oxide in the state of the art. | | | | | | | |
|---|---|---|---|---|---|---|---|
| | $SnO_2$ | Ag | NiCr | $SnO_2$ | Ag | NiCr | $SnO_2$ |
| Thickness in Å | 440 | 100 | 17 | 840 | 140 | 17 | 350 |
| Surface resistance | R. | | 3.0 Ω | | | | |
| Light transmission | T | | 74% | | | | |
| Color coordinates | | $a*$ | | −3.4 | | | |
| | | $b*$ | | 2.9 | | | |
| Reflection, coated side | | $R_f$ | | 3.8% | | | |
| | | $a*$ | | −3.4 | | | |
| | | $b*$ | | 2.7 | | | |
| Reflection, glass side | | $R_g$ | | 4.4% | | | |
| | | $a*$ | | −1.17 | | | |
| | | $b*$ | | −0.1 | | | |

| 2. Low-e coating with $SnMgO_2$ oxide with NiCr blocker according to the present invention: | | | | | | | |
|---|---|---|---|---|---|---|---|
| | $SnMgO_2$ | Ag | NiCr | $SnMgO_2$ | Ag | NiCr | $SnMgO_2$ |
| Thickness in Å | 440 | 100 | 7 | 840 | 140 | 7 | 350 |
| Surface resistance | R. | | 2.5 Ω | | | | |
| Light transmission | T | | 78% | | | | |
| Color coordinates | | $a*$ | | −4.1 | | | |
| | | $b*$ | | 2.8 | | | |
| Reflection, coated side Color coordinates | | $R_f$ | | 5.5% | | | |
| | | $a*$ | | −1.2 | | | |
| | | $b*$ | | 2.2 | | | |
| Reflection, glass side Color coordinates | | $R_g$ | | 5.5% | | | |
| | | $a*$ | | −1.1 | | | |
| | | $b*$ | | −3.8 | | | |

| 3. Low-e coating with $SnMgO_2$ oxide without a first blocker, in accord with the present invention | | | | | | | |
|---|---|---|---|---|---|---|---|
| | $SnMgO_2$ | Ag | NiCr | $SnMgO_2$ | Ag | NiCr | $SnMgO_2$ |
| Thickness in Å | 440 | 100 | — | 840 | 140 | | 350 |
| Surface resistance | R. | | 2.6 Ω | | | | |
| Light transmission | T | | 80% | | | | |
| Color coordinates | | $a*$ | | −3.8 | | | |
| | | $b*$ | | 72.7 | | | |
| Reflection, coated side Color coordinates | | $R_f$ | | 5.4% | | | |
| | | $a*$ | | −2.4 | | | |
| | | $b*$ | | 1.6 | | | |
| Reflection, glass side Color coordinates | | $R_g$ | | 5.4% | | | |
| | | $a*$ | | −2.0 | | | |
| | | $b*$ | | −2.1 | | | |

What is claimed is:

1. Coated substrate comprising:

a transparent substrate, a first layer of oxides of a metal alloy SnX deposited on the surface of the support, X being one of the metals Mg, Al, Zr, Ti or Ta and the content of X being 5 to 15 atomic percent, a first silver layer deposited on the metal oxide layer, a second metal oxide layer of a metal alloy SnY deposited over the first silver layer, Y being one of the metals Mg, Al, Zr, Ti, or Ta and the content of Y being 5 to 15 atomic percent, a second silver layer deposited on the second metal oxide layer, and a third metal oxide layer of a metal alloy SnZ deposited over the second silver layer, Z being one of the metals Mg, Al, Zr, Ti, or Ta and the content of Z being 5 to 15 atomic percent.

2. A coated substrate as in claim 1 further comprising a first metallic blocker layer deposited on said first silver layer, said first metallic blocker layer consisting of one of Ti, Zr, In, alloys thereof, and NiCr.

3. A coated substrate as in claim 2 wherein said first metallic blocker layer is less than 10 Angstroms thick.

4. A coated substrate as in claim 2 wherein said first metallic blocker layer is partially oxidized.

5. A coated substrate as in claim 1 further comprising a second metallic blocker layer deposited on said second silver layer, said second metallic blocker layer consisting of one of Ti, Zr, In, alloys thereof, and NiCr.

6. A coated substrate as in claim 5 wherein said second metallic blocker layer is less than 10 Angstroms thick.

7. A coated substrate as in claim 5 wherein said second metallic blocker layer is partially oxidized.

8. A coated substrate as in claim 1 wherein said first, second, and third oxide layers are all formed from the same alloy.

9. A coated substrate as in claim 8 wherein X, Y, and Z are magnesium.

10. A coated substrate as in claim 1 wherein said second silver layer is thicker than said first silver layer.

11. A coated substrate as in claim 1 wherein said second metal oxide layer is deposited directly on said first silver layer, without any intervening blocker layer.

12. A coated substrate as in claim 1, wherein said third metal oxide layer is deposited directly on said second silver layer, without any intervening blocker layer.

13. A coated substrate as in claim 2 wherein said first metallic blocker layer is NiCr.

14. A coated substrate as in claim 5 wherein said second metallic blocker layer is NiCr.

* * * * *